United States Patent [19]
Aggen et al.

[11] 3,840,797
[45] Oct. 8, 1974

[54] RELATED POWER SUPPLY

[75] Inventors: Clifford F. Aggen, Camarillo; Harry P. Lee, Oxnard, both of Calif.

[73] Assignee: The United States of America as represented by the Secretary of the Navy, Washington, D.C.

[22] Filed: Dec. 28, 1970

[21] Appl. No.: 101,928

[52] U.S. Cl. .................................... 321/2, 321/19
[51] Int. Cl. .......................................... H02m 3/32
[58] Field of Search .......... 321/2, 14, 18, 19; 323/9; 315/27 TD

[56] References Cited
UNITED STATES PATENTS
| | | | |
|---|---|---|---|
| 2,701,301 | 2/1955 | Hulst | 321/2 |
| 3,327,199 | 6/1967 | Gardner et al. | 321/2 |
| 3,437,905 | 4/1969 | Healy et al. | 321/19 |
| 3,453,526 | 7/1969 | Bowles | 321/19 |
| 3,480,852 | 11/1969 | Hung | 321/19 X |
| 3,579,077 | 5/1971 | Cameron | 321/2 |

Primary Examiner—William H. Beha, Jr.
Attorney, Agent, or Firm—R. S. Sciascia; Joseph M. St. Amand

[57] ABSTRACT

A solid-state high-voltage regulation circuit for devices such as television receivers which incorporate a flyback transformer. Voltage changes across the transformer secondary winding are compared to a stable reference, and any difference is amplified and applied to control the flow of current to the transformer primary coil. The output voltage is thus maintained essentially constant.

1 Claim, 5 Drawing Figures

CLIFFORD F. AGGEN
HARRY P. LEE
INVENTORS 3,840,797

RELATED POWER SUPPLY

STATE OF GOVERNMENT INTEREST

The invention described herein may be manufactured and used by or for the Government of the United States of America for governmental purposes without the payment of any royalties thereon or therefor.

BACKGROUND OF THE INVENTION

In many high-voltage applications it has been found that unregulated power supplies are incapable of preventing undesired operational fluctuations in the utilization device supplied thereby. For example, in cathode-ray tube displays, an increase in the brightness level produces an image distortion known as "blooming", due to increased demand on the H.V. power supply and the resultant lower output voltage. To overcome this drawback, many arrangements incorporate regulator tubes, zener diodes, or other constant-voltage devices. However, all of these expedients have the disadvantage of requiring the dissipation of energy in the regulation element when the output power demand is low. This inefficiency is compounded in the case of tubes which can constitute a health hazard by generating X-ray radiation.

SUMMARY OF THE INVENTION

The present concept is directed to a high-voltage regulating circuit which differs from known arrangements by requiring only a small amount of power for its operation. Especially useful when flyback transformers are utilized, the invention network cuts down the power applied to such transformer when the output demand is low. Conversely, in times of high output requirements, it automatically steps up the input energy to meet such demand. Through the use of solid-state components, reliability of operation is unusually high, and furthermore no danger from X-ray radiation is present.

STATEMENT OF THE OBJECTS OF THE INVENTION

One object of the present invention, therefore, is to provide an improved high-voltage regulation circuit which is simple in design and reliable in operation.

Another object of the invention is to provide a high-voltage regulation circuit especially useful in power supplies incorporating a flyback transformer.

A further object of the invention is to provide a high-voltage power supply regulation circuit which dissipates relatively little energy even during periods when the output power demand is low.

An additional object of the invention is to provide a regulating circuit for high-voltage power supplies in which there is no potential danger from X-ray radiation.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
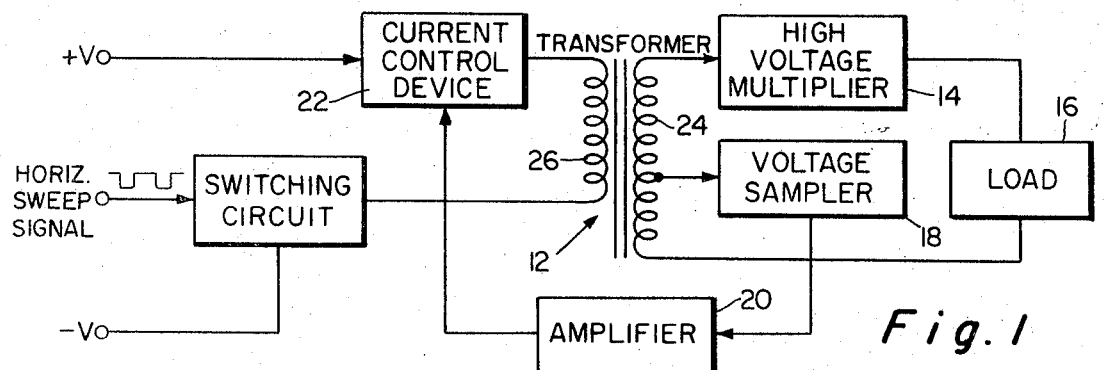
FIG. 1 is a block diagram of a high-voltage power supply incorporating a regulating circuit designed in accordance with a preferred embodiment of the present invention.

In FIG. 1 of the drawings is illustrated a block diagram of a high-voltage regulating circuit designed in accordance with a preferred embodiment of the present invention. The concept is shown as applied to a conventional power supply in which a cyclically varying voltage 10 (such as the horizontal sweep signal of a television receiver) is applied to a step-up transformer 12 and then through a voltage multiplier 14 of known design to a load 16. In the illustration given, this load may be the second anode of a cathode-ray tube.

The invention in the illustrated embodiment includes a voltage sampler 18, a high gain amplifier 20, and a current control device 22. The voltage sampler 18 picks up voltage changes on the secondary winding 24 of transformer 12, these changes being representative of corresponding changes across the load 16. This sampled voltage is then compared with a reference voltage within the amplifier 20, any change or difference therebetween being augmented and applied to the current control device 22. The latter allows more or less current to flow into the primary winding 26 of transformer 12 depending on the magnitude of the signal received from amplifier 20.

When the output voltage of multiplier 14 is dropping, for example, due to a large load current, the regulation circuit described above will permit more current to flow into transformer 12 in order to meet the output requirement and hence maintain the output voltage constant. Conversely, when the output voltage is rising due to a small load current, the invention network will cut down the current flowing into transformer 12 and again maintain the output at a constant level.

Figure 2:
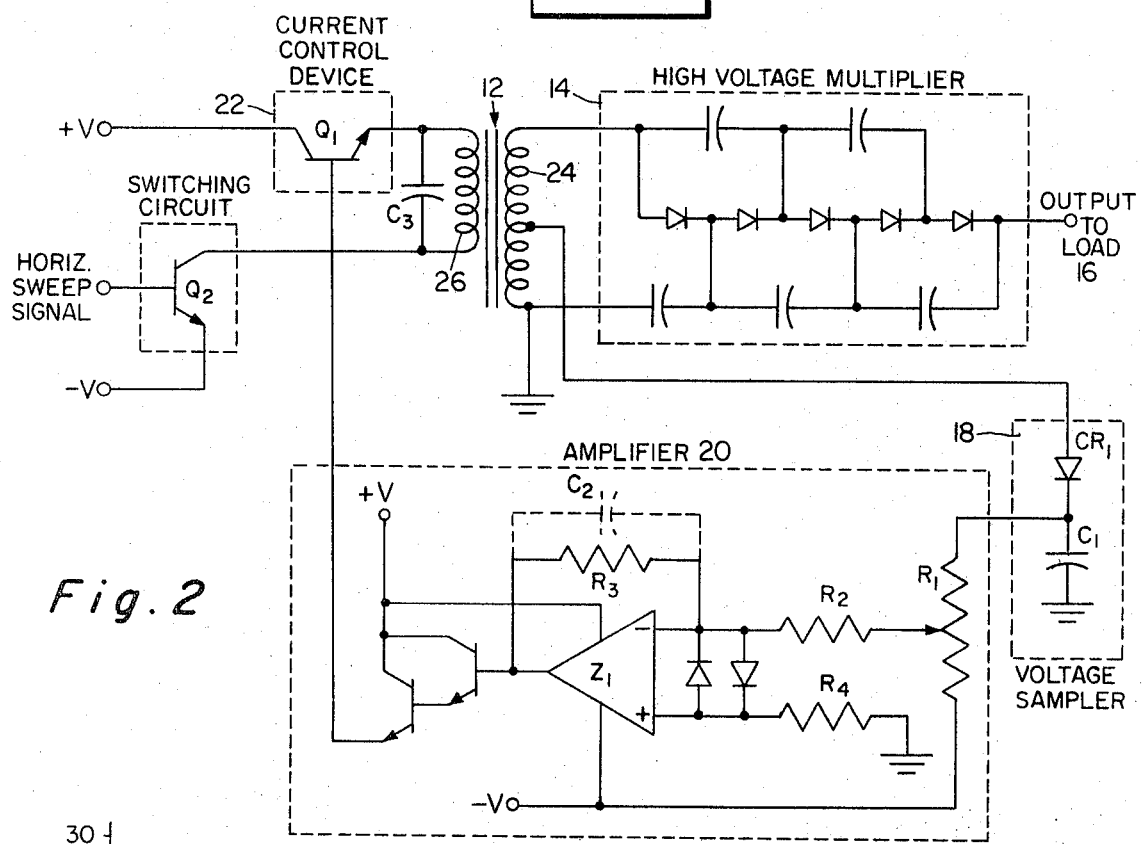
FIG. 2 is a schematic circuit diagram of the power supply of FIG. 1 showing one possible arrangement of the individual components thereof.

FIG. 2 of the drawings illustrates one possible arrangement of components for the system of FIG. 1 which has been found satisfactory in practice. The voltage sampler 18 is made up of CR1 and C1; the network 20 includes an operational amplifier Z1 connected as a high-gain inverting amplifier; while a power transistor Q1 acts as the current control device 22 to determine the amount of current flowing into the primary winding 26 of transformer 12.

The voltage at the inverting input of the operational amplifier Z1 is set by a potentiometer R1, which is connected between the output of sampler 18 and −V. The non-inverting input of Z1 is connected to ground, or zero potential, through R4. A resistor R3 shunts the inverting input and output of Z1 as shown. Applying the op-amp formula, when R2 = 33K and R33 = 22M, the output of Z1 can be expressed as $$E_{out} = - R3/R2 \, E_{in}$$
$$= - 22 \times 10^6/33 \times 10^3 \, E_{in}$$
$$= - 667 \, E_{in}$$

Now, if the input voltage $E_{in}$ for Z1 is positive, then the output $E_{out}$ will be negative; if $E_{in}$ is negative, $E_{out}$ will be positive. Thus, when the high voltage at the output of multiplier 14 is dropping, the sampled voltage from 18 will also be dropping, which will make $E_{in}$ negative-going. This in turn will make $E_{out}$ positive-going, and transistor Q1 will allow more current to flow into the primary winding 26 of transformer 12. This raises the voltage at the output of 14 to its original level.

The converse is equally true - when the output voltage is increasing because the load current is small, $E_{in}$ will be positive-going and $E_{out}$ will be negative-going. Hence Q1 cuts down the current flowing into transformer 12.

Since the regulation circuit operates as a feedback loop, it has a given response time which is directly related to the bandwidth of Z1. The wider this bandwidth, the faster will be the response time. However, too great a bandwidth results in instability, since the voltage gain is high. Consequently, a capacitor C2 may optionally be added, if desired, across R3 to reduce the bandwidth of Z1 and yield increased stability of operation along with an integrating effect at high frequencies. This expedient, however, is often unnecessary for efficient operation of the invention circuitry.

Figure 3:
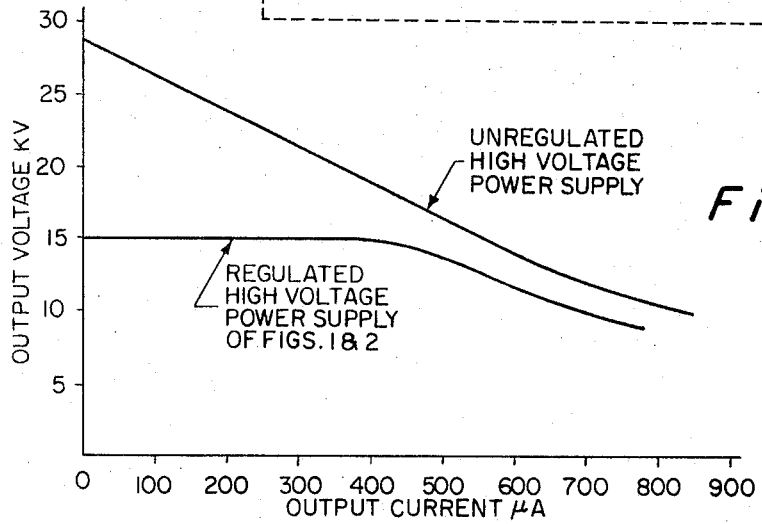
FIG. 3 is a graph illustrating the improved results obtainable through utilization of the circuit of FIGS. 1 and 2 as compared to unregulated power supplies.

The two curves of FIG. 3 bring out the manner in which the circuit of FIGS. 1 and 2 helps to stabilize the output of the power supply. As shown, the regulated output voltage is essentially constant of 15 KV over the current range from 0 $\mu$ amps. to 400 $\mu$ amps., while conventional supplies drop from approximately 30 KV to less than 20 KV during the same current range. In obtaining the data for the unregulated circuit, the invention network was disconnected from the system of FIGS. 1 and 2 and the primary winding 26 of transformer 12 connected directly to +V. In both cases, capacitor C3 was employed to tune transformer 12 for optimum energy transfer.

The voltages developed in the regulation circuit of FIGS. 1 and 2 are quite low - even the sampled voltage from network 18 will not normally exceed approximately 10 volts.

Exemplary values for C1 and C2 are 0.01 $\mu f$; for R1, 1M; and for R4, 33K. Operating voltages +V and -V are ± 12.5 volts.

Figure 4:
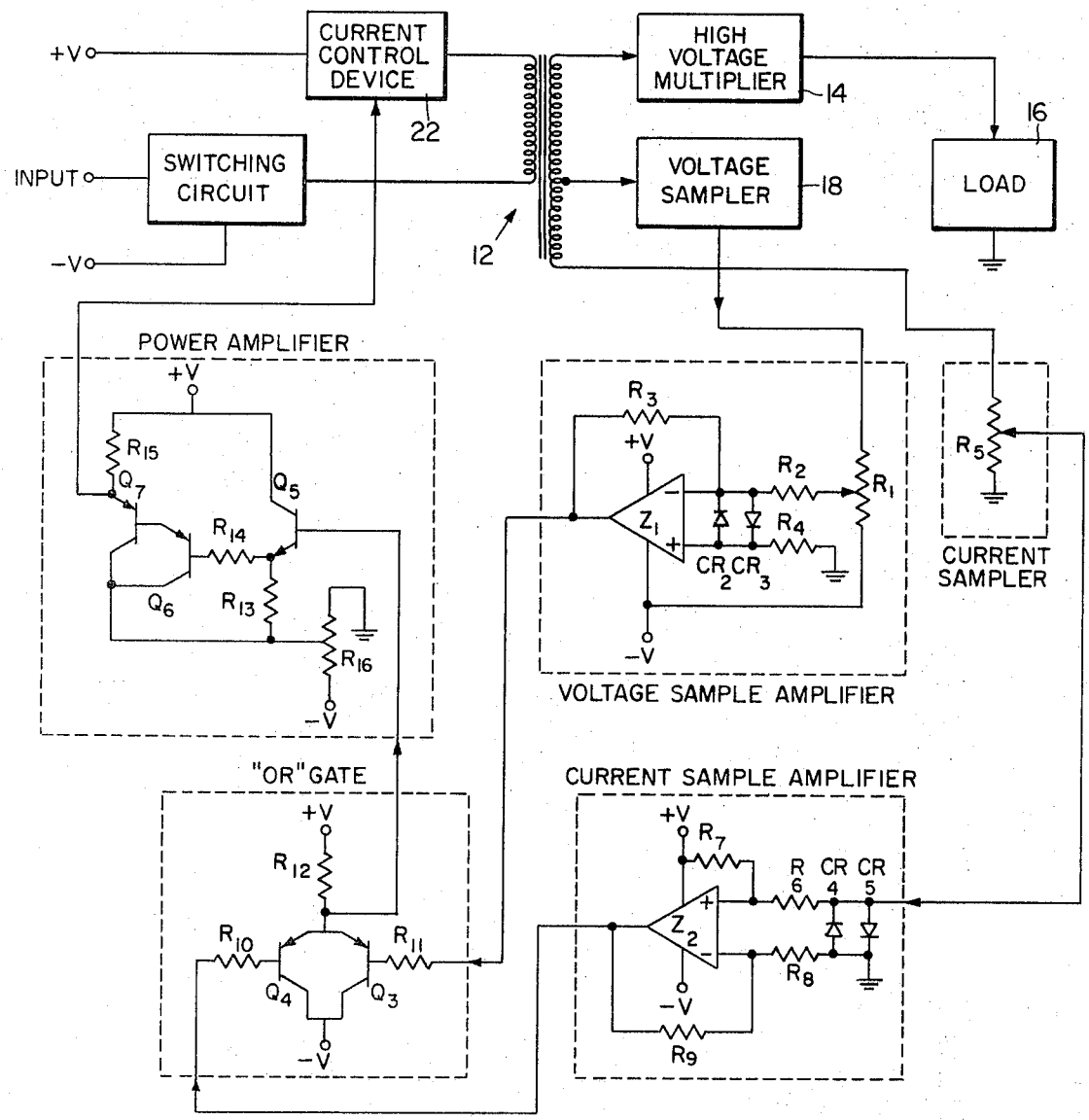
FIG. 4 is a schematic circuit diagram of another embodiment of the invention.

A current-limiting feature may be added to the high voltage power supply of FIG. 1 as shown in FIG. 4 of the drawings. The current through the load 16 is sensed by resistor R5, which is adjustable so that the amount of output current can be selected. One end of R5 is connected to ground and the other end is connected to the return end of the high-voltage transformer secondary, as shown. Thus, any increase in current through R5 will cause an increase of negative voltage across R5 with respect to ground. Now, since the voltage across this sensing resistor R5 increases negatively with increasing current, and the current control device 22 allows less current to pass through it when its control voltage goes negative, any amplifier that is to be inserted between R5 and the current control device 22 must be a non-inverting amplifier. Hence, the current sample amplifier Z2 is an operational amplifier that is connected in the non-inverting mode. The two diodes CR4 and CR5 at the input of Z2 are used to protect the operational amplifier from unexpected voltage surges or transients. The resistors R8 and R9 fix the gain for the inverting input, and R6 and R7 fix the gain for the non-inverting input. The two gain values are made the same. The output of the current sample amplifier is fed into transistor Q4, which forms an OR gate with transistor Q3. This OR gate is actually a voltage follower, except that it only follows the lower (or more negative) of the two voltages at the respective bases of Q3 and Q4. Thus, the OR gate serves as a switch that switches the power supply to operate from a voltage-regulating mode to a current-limiting mode automatically as the load conditions require. From the emitters of Q3 and Q4, the control voltage is then fed into the power amplifier, which is made up of two emitter followers Q5 and Q6, one being a NPN and the other being a PNP. The output of the power amplifier then controls the amount of current going through the current control device 22 to the primary of the transformer 12. As a result, the output current is limited to a desired value.

Figure 5:
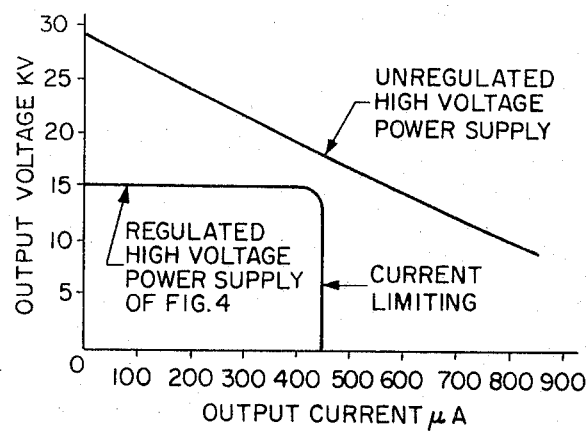
FIG. 5 is a graph illustrating the results obtainable when utilizing the circuit of FIG. 4.

The advantage of a current-limiting feature as shown in FIG. 4 is that, in case of a short circuit, the output current will be limited to a safe value that protects the components in the current path. As shown in FIG. 5, the current is limited to such a value, even under short circuit conditions. In a power supply that has no current-limiting feature, the current increases significantly at short circuit, and may damage any components in the current path.

Exemplary values for the circuit of FIG. 4 are:

R5 = 5K
R6 = 10K
R7 = 1M
R8 = 10M
R9 = 1M
R10 = 100K
R11 = 100K
R12 = 10K
R13 = 1K
R14 = 1K
R15 = 100Ohms Although described in connection with a television receiver, the disclosed concept is applicable to such devices as infra-red monitors, electron microscopes, image intensifiers, ion pumps, laser power supplies, etc.

Obviously many modifications and variations of the present invention are possible in the light of the above teachings. It is therefore to be understood that within the scope of the appended claims the invention may be practiced otherwise than as specifically described.

We claim:

1. In a d.c. power supply of the type in which a cyclically-varying voltage is stepped up by a transformer having primary and secondary windings and then applied to a load through a rectifier, and in which the value of the voltage appearing across said load is subject to change due to variations in load current, the improvement which comprises:

means for connecting the input of said power supply to a cyclically-varying voltage;

means for stabilizing the value of the voltage appearing across said load regardless of variations in the current therethrough, said means including:

means connected directly to a tap on the secondary winding of said transformer for sensing changes in the voltage output of said transformer due to variations in load;

a first operational amplifier having its inverting input connected to the output of said voltage sensing means whereby said amplifier functions as a high-gain inverting amplifier;

a parallel resistance-capacitance network connected between the input and output of said operational amplifier to limit the bandwidth for maximum circuit stability;

means for limiting the output current to a desired value, said means including:

current sampling means connected to the return end of said transformer secondary;

a second operational amplifier having its non-inverting input connected to the output of the current sampling means;

a power transistor interposed between the primary of said transformer and said cyclically-varying voltage; and means for applying the output of the first and second operational amplifiers to the power transistor, said means comprising;

an OR gate connected to the output of said first and second operational amplifiers; and a power amplifier connected between the OR gate and power transistor whereby the passage of the cyclically-varying voltage and current is controlled.

* * * * *